US012581305B2

(12) United States Patent
Bilgin et al.

(10) Patent No.: US 12,581,305 B2
(45) Date of Patent: Mar. 17, 2026

(54) HANDLING A REQUEST TO INITIATE A CALL

(71) Applicant: Telefonaktiebolaget LM Ericsson (publ), Stockholm (SE)

(72) Inventors: Zeki Bilgin, Istanbul (TR); Ferhat Karakoc, Istanbul (TR); Emrah Tomur, Izmir (TR); Elif Ustundag Soykan, Istanbul (TR); Leyli Karacay, Istanbul Ümraniye (TR); Mehmet Akif Ersoy, Istanbul (TR); Pinar Comak, Ankara (TR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 524 days.

(21) Appl. No.: 18/018,643

(22) PCT Filed: Jan. 29, 2021

(86) PCT No.: PCT/EP2021/052168
§ 371 (c)(1),
(2) Date: Jan. 30, 2023

(87) PCT Pub. No.: WO2022/022861
PCT Pub. Date: Feb. 3, 2022

(65) Prior Publication Data
US 2023/0319567 A1     Oct. 5, 2023

(51) Int. Cl.
*H04W 12/084*     (2021.01)
*H04M 1/72484*    (2021.01)
*H04W 12/80*      (2021.01)

(52) U.S. Cl.
CPC ..... *H04W 12/084* (2021.01); *H04M 1/72484* (2021.01); *H04W 12/80* (2021.01)

(58) Field of Classification Search
CPC ..... H04W 12/084; H04W 12/80; H04W 4/90; H04W 4/10; H04M 1/72484;
(Continued)

(56) References Cited

U.S. PATENT DOCUMENTS 8,792,902 B2 *  7/2014  Edge ........................ H04W 8/08
                                                  455/456.2
8,868,072 B2 * 10/2014  Martinez ................. H04N 7/147
                                                  455/550.1
(Continued)

FOREIGN PATENT DOCUMENTS

EP           1351435 A1 * 10/2003   .......... H04L 65/1101
EP           2993861 A1 *  3/2016   ............. H04L 45/22
WO   WO-2005079002 A1 *  8/2005   ............. H04W 8/08
WO   WO-2007117358 A2 * 10/2007   .......... H04L 65/1069

OTHER PUBLICATIONS

Auffret Jean-Marc et al.), (EP-1351435-A1), Streaming Method For Transmitting Telephone System Notifications To Internet Terminal Devices In Real Time, Oct. 8, 2003, all pages and figures, (Year: 2003).*
(Continued)

*Primary Examiner* — Mahendra R Patel
(74) *Attorney, Agent, or Firm* — Sage Patent Group

(57) ABSTRACT

There is provided a method for handling a request to initiate a call. The method is performed by a server entity. In response to receiving a first request for a first client entity to initiate a call to a second client entity without the second client entity rendering a notification of the call, transmission of a first message is initiated towards one or more third client entities to inform the one or more third client entities of the first request. The first client entity is authorised to initiate the call only if a second message, acknowledging the first request, is received from at least one of the one or more third client entities.

20 Claims, 7 Drawing Sheets

(58) Field of Classification Search
CPC ............... H04L 63/308; H04L 65/1046; H04L
65/1076; H04L 65/4061; H04L 65/1069
USPC ........................................................ 455/411
See application file for complete search history.

(56) References Cited

U.S. PATENT DOCUMENTS

| | | | | |
|---|---|---|---|---|
| 10,192,553 | B1 * | 1/2019 | Chenier | H04L 65/80 |
| 10,841,411 | B1 * | 11/2020 | Nandyal | H04M 1/2535 |
| 2003/0236924 | A1 * | 12/2003 | Auffret | H04M 7/0009 |
| | | | | 370/395.5 |
| 2007/0280464 | A1 * | 12/2007 | Hughes | H04M 7/003 |
| | | | | 379/205.01 |
| 2008/0148379 | A1 * | 6/2008 | Xu | H04L 65/1069 |
| | | | | 726/11 |
| 2014/0375747 | A1 * | 12/2014 | Martinez | H04L 65/1104 |
| | | | | 348/14.02 |
| 2015/0236863 | A1 * | 8/2015 | Castro Castro | H04L 12/1407 |
| | | | | 370/259 |
| 2018/0262500 | A1 * | 9/2018 | De Kievit | H04W 12/088 |
| 2019/0037617 | A1 * | 1/2019 | Kapatralla | H04L 65/1073 |

OTHER PUBLICATIONS

International Search Report and Written Opinion of the International Searching Authority, PCT/EP2021/052168, mailed Apr. 29, 2021, 10 pages.
3GPP TSG-SA WG6 Meeting #36-BIS-e, S6-200571, E-meeting, Mar. 31-Apr. 8, 2020, "Minor changes to ambient listening procedures on user indication," Samsung, Work Item enh3MCPTT, XP051904130, 4 pages.
3GPP TS 23.281 v17.6.0 (Jun. 2021), Technical Specification Group Services and System Aspects, Functional architecture and information flows to support Mission Critical Video (MCVideo), Stage 2 (Release 17), 186 pages.
3GPP TS 22.179 v17.0.0 (Dec. 2019), Technical Specification Group Services and System Aspects, Mission Critical Push To Talk (MCPTT), Stage 1 (Release 17), 88 pages.
3GPP TS 23.379 v17.7.0 (Jun. 2021), Technical Specification Group Services and System Aspects, Functional architecture and information flows to support Mission Critical Push To Talk (MCPTT), Stage 2 (Release 17), 250 pages.

* cited by examiner

Initiate transmission of a second message
acknowledging a first request for a first
client entity to initiate a call                        202

HANDLING A REQUEST TO INITIATE A CALL

CROSS REFERENCE TO RELATED APPLICATIONS

This application is a 35 U.S.C. § 371 national stage application of PCT International Application No. PCT/EP2021/052168 filed on Jan. 29, 2021, which in turn claims foreign priority to Turkish Patent Application No. 2020/12172, filed on Jul. 31, 2020, the disclosures and content of which are incorporated by reference herein in their entirety.

TECHNICAL FIELD

The disclosure relates to methods for handling a request to initiate a call and entities configured to operate in accordance with those methods.

BACKGROUND

There are various situations in which calls may be initiated between entities. Some of these situations may involve a mission critical push to talk (MCPTT) service and/or a mission critical video (MCVideo) service, which are defined in 3GPP TS 22.179 and TS 23.281 respectively. The MCPTT service is a push to talk (PTT) communication service, which supports applications for mission critical organisations and mission critical applications for other businesses and organizations (e.g. utilities, railways, etc.). It is a group communication services that is known to have fast setup times, high availability, the ability to handle large groups, strong security, reliability, and priority handling. An MCPTT user can be any user that has a device with the capability to participate in an MCPTT service. The device can, for example, be an MCPTT user equipment (UE). An MCPTT UE is any UE that enables an MCPTT user to participate in an MCPTT service. A dispatcher is an example of an MCPTT user that participates in MCPTT communications for command and control purposes.

A PTT communication service provides an arbitrated method by which two or more users may communicate. The users of a PTT communication service may request permission to transmit to other users (e.g. traditionally by means of a press of a button). An MCPTT service supports an enhanced PTT communication service, which is suitable for mission critical scenarios, based on third generation partnership (3GPP) system services. An MCPTT service is intended to support communication between several users (i.e. a group call), where each user has the ability to gain permission to talk in an arbitrated manner. Similarly, an MCVideo service supports video media communication between several users (i.e. group call), where each user has the ability to gain permission to stream video in an arbitrated manner. Both MCPTT and MCVideo services also support private calls between pairs of users. That is, a call between a pair of users using an MCPTT or MCVideo service can be a private call. MCPTT and MCVideo services are built on the existing 3GPP transport communication mechanisms provided by the 3GPP architectures to establish, maintain, and terminate the actual communication path(s) among users.

Ambient listening is a feature that allows an authorised MCPTT user (typically a dispatcher) to cause an MCPTT UE of another user to initiate an audio call without that MCPTT UE providing any indication that it is transmitting audio. Ambient listening can be initiated by a remote authorised MCPTT user that wants to listen to another MCPTT user. The purpose of ambient listening is to allow an authorised MCPTT user to listen to activities at the location of an MCPTT UE of another user to find out what is happening around that MCPTT UE without making the user of that MCPTT UE or any people around that MCPTT UE aware that the listening is happening. An ambient listening call is different from other types of call (e.g. group calls) as, for an ambient listening call, audio is only transmitted to one party in the call, such as a dispatcher or an authorised MCPTT user that is acting in a similar role to a dispatcher.

FIG. 1 illustrates an information flow for a remotely initiated ambient listening call setup according to an existing technique. According to 3GPP TS 23.379, the MCPTT service provides the capability for an authorised user to initiate a remotely initiated ambient listening call at an MCPTT client. In the existing technique illustrated in FIG. 1, MCPTT client 1 is a client of a user that is authorised to invoke a remotely initiated ambient listening call to MCPTT client 2. The user at MCPTT client 1 is the "listening" user and the user at MCPTT client 2 is the "listened to" user.

As illustrated by arrow 300 of FIG. 1, MCPTT client 1 initiates an ambient listening call by sending an ambient listening call request to an MCPTT server. The ambient listening call type is included in this request. As illustrated by block 302 of FIG. 1, the MCPTT server performs an authorisation check to check that the user at MCPTT client 1 is authorised to initiate the ambient listening call. If the authorisation fails, the MCPTT server provides a failure response to MCPTT client 1 (which is not illustrated in FIG. 1). Otherwise, as illustrated by arrow 304 of FIG. 1, the MCPTT server sends the ambient listening call request to MCPTT client 2. As illustrated by arrow 306 of FIG. 1, MCPTT client 2 returns an ambient listening call response to the MCPTT server. As illustrated by arrow 308 of FIG. 1, the MCPTT server then provides an ambient listening call response to MCPTT client 1. This response indicates whether the call set up is successful or unsuccessful.

As illustrated by arrow 310 of FIG. 1, a floor control server of the MCPTT server then sends a floor granted message to MCPTT client 2 according to the ambient listening type received at arrow 300. Accordingly, as illustrated by arrow 312 of FIG. 1, the floor control server of the MCPTT server sends a floor taken message to MCPTT client 1. After receiving the floor granted message at MCPTT client 2, as illustrated by arrows 314 and 316 of FIG. 1, media (which, in this case, is audio) is transmitted from MCPTT client 2 to MCPTT client 1 via the MCPTT server. MCPTT client 2 does not provide any indication of the ambient listening call to its user.

Similar to an ambient listening call, an ambient viewing call is a feature that allows an authorised MCVideo user (typically a dispatcher) to cause an MCVideo UE of another user to initiate a video call without that MCPTT UE providing any indication that it is transmitting video. Ambient viewing can be initiated by a remote authorised MCVideo user that wants to view another MCVideo user. The purpose of ambient listening is to allow an authorised MCVideo user to view activities at the location of an MCVideo UE of another user to find out what is happening around that MCVideo UE without making the user of that MCVideo UE or any people around that MCVideo UE aware that the viewing is happening.

FIG. 2 illustrates an information flow for a remotely initiated ambient viewing call setup according to an existing technique. In the existing technique illustrated in FIG. 2, MCVideo client 1 is a client of a user that is authorised to invoke a remotely initiated ambient viewing call to MCVideo client 2. The user at MCVideo client 1 is the "viewing" user and the user at MCVideo client 2 is the "viewed" user.

As illustrated by arrow 400 of FIG. 2, MCVideo client 1 initiates an ambient viewing call by sending an ambient viewing call request to an MCVideo server. The ambient viewing call type is included in this request. As illustrated by block 402 of FIG. 2, the MCVideo server performs an authorisation check to check that the user at MCVideo client 1 is authorised to initiate the ambient viewing call. If the authorisation fails, the MCVideo server provides a failure response to MCVideo client 1 (which is not illustrated in FIG. 2). Otherwise, as illustrated by arrow 404 of FIG. 2, the MCVideo server sends the ambient viewing call request to MCVideo client 2. As illustrated by arrow 406 of FIG. 2, MCVideo client 2 returns an ambient viewing call response to the MCVideo server. As illustrated by arrow 408 of FIG. 2, the MCVideo server then provides an ambient viewing call response to MCVideo client 1. This response indicates whether the call set up is successful or unsuccessful.

As illustrated by arrow 410 of FIG. 2, the MCVideo server then sends a transmit media granted message to MCVideo client 2 according to the ambient viewing type received at arrow 400. After receiving the transmit media granted message at MCVideo client 2, as illustrated by arrows 412 and 414 of FIG. 2, media (which, in this case, is video) is transmitted from MCVideo client 2 to MCVideo client 1 via the MCVideo server. MCVideo client 2 does not provide any indication of the ambient viewing call to its user.

Thus, in this way, ambient listening calls and ambient viewing calls respectively allow a user to listen to and watch the surroundings of another (remote) user without any indication on the targeted UE. This feature is commonly used for stolen UEs, monitoring officers, officer safety and particular operations, where it is important that the UE does not indicate that a call is happening. However, ambient listening calls and ambient viewing calls can easily be misused or exploited for malicious purposes. For example, an authorised MCPTT user can listen to another MCPTT user's environment in bad faith, or an authorised MCVideo user can maliciously activate a camera of an MCVideo UE of another user to watch the environment of that user.

SUMMARY

It is thus an object of the disclosure to obviate or eliminate at least some of the above-described disadvantages associated with existing techniques.

Therefore, according to an aspect of the disclosure, there is provided a method for handling a request to initiate a call. The method is performed by a server entity. The method comprises, in response to receiving a first request for a first client entity to initiate a call to a second client entity without the second client entity rendering a notification of the call, initiating transmission of a first message towards one or more third client entities to inform the one or more third client entities of the first request. The method comprises authorising the first client entity to initiate the call only if a second message, acknowledging the first request, is received from at least one of the one or more third client entities.

There is thus provided an advantageous method for handling a request to initiate a call. In particular, the method extends the existing protocols of ambient (e.g. listening and/or viewing) calls to make the initiation of such calls more transparent to one or more other (e.g. authorised) entities. The initiation of a call used for such a purpose is more transparent since it is no longer possible for the call to be initiated by a single user and one or more other entities need to provide acknowledgment for any request to initiate such a call. More precisely, a new role is defined for certain client entities (namely, the one or more third client entities), such that they can witness the initiation of the calls. In effect, there is a control or an audit introduced at the technical and protocol level, which does not depend on human initiative and/or manual control.

The increase in transparency in the initiation of calls creates a deterrent against, and thus makes the calls more resistant to, any misuse or malicious exploitation. Any privacy and/or misuse concerns associated with ambient (e.g. listening and/or viewing) calls can be reduced in this way. The method provides a security-enhanced ambient (e.g. listening and/or viewing) call. Moreover, this is possible without harming the effectiveness of the call. The first client entity still simply needs to request initiation of a call and there is still no notification at the second client entity that the call is happening and thus the configuration allows the original settings to be maintained.

In some embodiments, the method may comprise authorising the first client entity to initiate the call only if the first request is approved by at least one of the one or more third client entities.

In some embodiments, authorising the first client entity to initiate the call only if the first request is approved by at least one of the one or more third client entities may comprise authorising the first client entity to initiate the call only if the first request is approved by at least a threshold number of the one or more third client entities, or authorising the first client entity to initiate the call only if the first request is approved by each of the one or more third client entities. In this way, a consensus-based decision is possible, rather than a single entity decision, which can make the call even more resistant to any misuse or malicious exploitation.

In some embodiments, the threshold number may be fixed or adaptive.

In some embodiments, the threshold number may be set based on contextual information for the first request and/or an identity of the second client entity.

In some embodiments, the second message received from at least one of the one or more third client entities may comprise information indicative of whether the first request is approved or denied and/or a third message received from at least one of the one or more third client entities may comprise information indicative of whether the first request is approved or denied.

In some embodiments, a number of third client entities towards which transmission of the first message is initiated may be set based on an identity of the second client entity.

In some embodiments, the method may comprise, if the first request is authorised, initiating transmission of the first request towards the second client entity and/or initiating transmission of a fourth message towards the first client entity, wherein the fourth message may be indicative that the first request is authorised. In some embodiments, the method may comprise, if the first request is not authorised, initiating transmission of a fifth message towards the first client entity, wherein the fifth message may be indicative that the first request is not authorised.

In some embodiments, the first message may comprise any one or more of an identifier that identifies the first client entity, an identifier that identifies the second client entity, information indicative of whether approval of the first request is required, and information indicative that the call is to be initiated by the first client entity.

In some embodiments, the at least one second message may comprise any one or more of an identifier that identifies the first client entity, an identifier that identifies the second client entity, and one or more identifiers that each identify one of the one or more third client entities.

In some embodiments, the one or more third client entities may comprise at least one third client entity that is predefined for the second client entity, at least one third client entity that is specified in the first request, and/or at least one third client entity that is randomly selected.

In some embodiments, the method may comprise randomly selecting at least one of the one or more third client entities.

In some embodiments, the method may comprise setting a maximum duration for the call, after which the call disconnects. In this way, even if the first client entity initiated a legitimate ambient call, the first client entity can be prevented from maliciously continuing to connect to the call when there is no longer a need to do so.

In some embodiments, the first message may comprise the maximum duration for the call.

In some embodiments, the call may be an audio and/or video call.

According to another aspect of the disclosure, there is provided a server entity comprising processing circuitry configured to operate in accordance with the method described earlier in respect of the server entity. The server entity thus provides the advantages described earlier in respect of the method performed by the server entity. In some embodiments, the server entity may comprise at least one memory for storing instructions which, when executed by the processing circuitry, cause the server entity to operate in accordance with the method described earlier in respect of the server entity.

According to another aspect of the disclosure, there is provided another method for handling a request to initiate a call. The method is performed by a third client entity. The method is performed in response to receiving a first message that informs the third client entity of a first request. The first request is a request for a first client entity to initiate a call to a second client entity without the second client entity rendering a notification of the call. The method comprises initiating transmission of a second message towards a server entity that initiated transmission of the first message towards the third client entity. The second message acknowledges the first request.

The method thus provides the advantages described earlier in respect of the method performed by the server entity.

In some embodiments, the method may comprise approving or denying the first request.

In some embodiments, the second message may comprise information indicative of whether the first request is approved or denied or the method may comprise initiating transmission of a third message towards the server entity, wherein the third message comprises information indicative of whether the first request is approved or denied.

In some embodiments, the method may comprise controlling a user interface to output a notification requesting a user input indicative of whether the first request is to be approved or denied and, in response to receiving the user input indicative of whether the first request is to be approved or denied, approving or denying the first request according to the user input.

In some embodiments, the first message may comprise any one or more of an identifier that identifies the first client entity, an identifier that identifies the second client entity, information indicative of whether approval of the first request is required, and information indicative that the call is to be initiated by the first client entity.

In some embodiments, the second message may comprise any one or more of an identifier that identifies the first client entity, an identifier that identifies the second client entity, and an identifier that identifies the third client entities.

In some embodiments, the third client entity may be a third client entity that is predefined for the second client entity, a third client entity that is specified in the first request, and/or a third client entity that is randomly selected.

In some embodiments, the call may be an audio and/or video call.

According to another aspect of the disclosure, there is provided a third client entity comprising processing circuitry configured to operate in accordance with the method described earlier in respect of the third client entity. The third client entity thus provides the advantages described earlier in respect of the method performed by the third client entity. In some embodiments, the third client entity may comprise at least one memory for storing instructions which, when executed by the processing circuitry, cause the third client entity to operate in accordance with the method described earlier in respect of the third client entity.

According to another aspect of the disclosure, there is provided a method performed by a system. The method comprises the method performed by the server entity as described earlier and the method performed by the third client entity as described earlier. The method thus provides the advantages described earlier in respect of the method performed by the server entity and the third client entity.

According to another aspect of the disclosure, there is provided a system comprising the server entity as described earlier and at least one third client entity as described. The system thus provides the advantages described earlier in respect of the server entity and the third client entity.

According to another aspect of the disclosure, there is provided a computer program comprising instructions which, when executed by processing circuitry, cause the processing circuitry to perform the method described earlier in respect of the server entity and the method described earlier in respect of the third client entity. The computer program thus provides the advantages described earlier in respect of the method performed by the server entity and the third client entity.

According to another aspect of the disclosure, there is provided a computer program product, embodied on a non-transitory machine-readable medium, comprising instructions which are executable by processing circuitry to cause the processing circuitry to perform the method described earlier in respect of the server entity and the method described earlier in respect of the third client entity. The computer program product thus provides the advantages described earlier in respect of the method performed by the server entity and the third client entity.

Thus, advantageous techniques for handling a request to initiate a call are provided.

BRIEF DESCRIPTION OF THE DRAWINGS

For a better understanding of the techniques, and to show how they may be put into effect, reference will now be made, by way of example, to the accompanying drawings, in which.

DETAILED DESCRIPTION

As mentioned earlier, advantageous techniques for handling a request to initiate a call are described herein. The call referred to herein can be an audio and/or video call. The techniques are implemented by a server entity and/or a third client entity.

Figure 1:
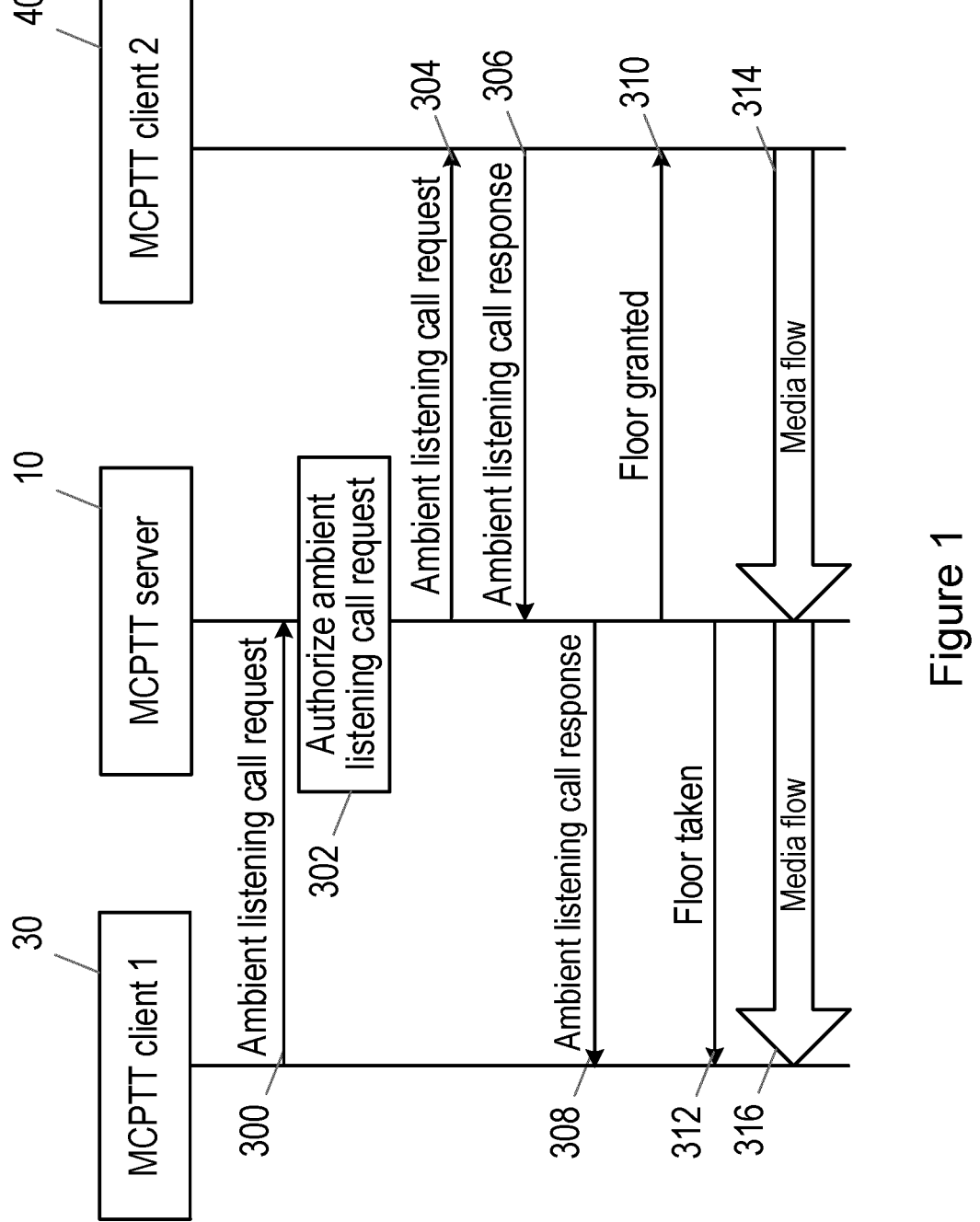
FIG. 1 is a signalling diagram illustrating an exchange of signals in a system according to an existing technique.
Figure 2:
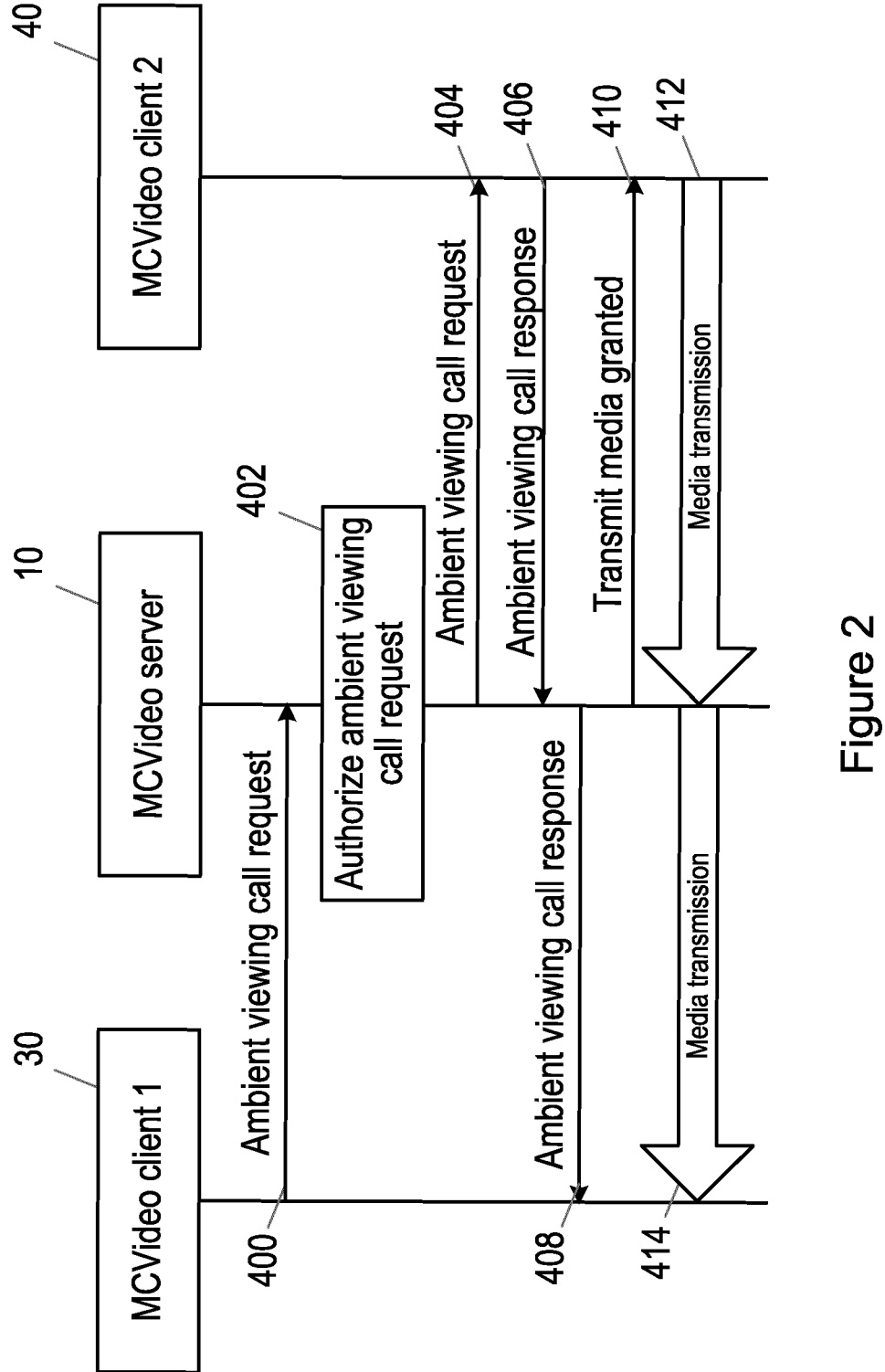
FIG. 2 is a signalling diagram illustrating an exchange of signals in a system according to an existing technique.
Figure 3:
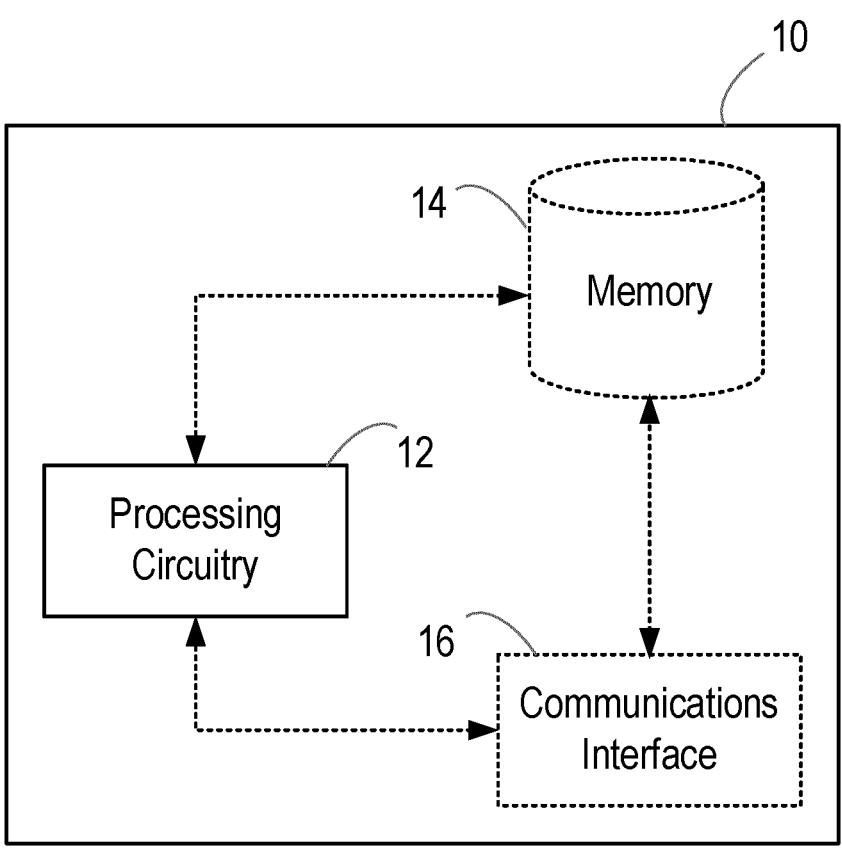
FIG. 3 is a block diagram illustrating a server entity according to an embodiment.

FIG. 3 illustrates the server entity 10 in accordance with an embodiment. The server entity 10 is for handling a request to initiate a call. The server entity 10 may, for example, be a physical machine or a virtual machine (VM). The server entity 10 is an entity that serves one or more client entities, e.g. any one or more first client entities as described herein, any one or more second client entities as described herein, any one or more third client entities as described herein, and/or any other client entities.

As illustrated in FIG. 3, the server entity 10 comprises processing circuitry (or logic) 12. The processing circuitry 12 controls the operation of the server entity 10 and can implement the method described herein in respect of the server entity 10. The processing circuitry 12 can be configured or programmed to control the server entity 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the server entity 10. In some embodiments, the processing circuitry 12 can be configured to run software to perform the method described herein in respect of the server entity 10. The software may be containerised according to some embodiments. Thus, in some embodiments, the processing circuitry 12 may be configured to run a container to perform the method described herein in respect of the server entity 10.

Briefly, the processing circuitry 12 of the server entity 10 is configured to, in response to receiving a first request for a first client entity to initiate a call to a second client entity without the second client entity rendering a notification of the call, initiate transmission of a first message towards one or more third client entities to inform the one or more third client entities of the first request. The processing circuitry 12 of the server entity 10 is configured to authorise the first client entity to initiate the call only if a second message, acknowledging the first request, is received from at least one of the one or more third client entities.

As illustrated in FIG. 3, in some embodiments, the server entity 10 may optionally comprise a memory 14. The memory 14 of the server entity 10 can comprise a volatile memory or a non-volatile memory. In some embodiments, the memory 14 of the server entity 10 may comprise a non-transitory media. Examples of the memory 14 of the server entity 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the server entity 10 can be connected to the memory 14 of the server entity 10. In some embodiments, the memory 14 of the server entity 10 may be for storing program code or instructions which, when executed by the processing circuitry 12 of the server entity 10, cause the server entity 10 to operate in the manner described herein in respect of the server entity 10. For example, in some embodiments, the memory 14 of the server entity 10 may be configured to store program code or instructions that can be executed by the processing circuitry 12 of the server entity 10 to cause the server entity 10 to operate in accordance with the method described herein in respect of the server entity 10. Alternatively or in addition, the memory 14 of the server entity 10 can be configured to store any information, data, messages, requests, responses, indications, notifications, signals, or similar, that are described herein. The processing circuitry 12 of the server entity 10 may be configured to control the memory 14 of the server entity 10 to store information, data, messages, requests, responses, indications, notifications, signals, or similar, that are described herein.

In some embodiments, as illustrated in FIG. 3, the server entity 10 may optionally comprise a communications interface 16. The communications interface 16 of the server entity 10 can be connected to the processing circuitry 12 of the server entity 10 and/or the memory 14 of server entity 10. The communications interface 16 of the server entity 10 may be operable to allow the processing circuitry 12 of the server entity 10 to communicate with the memory 14 of the server entity 10 and/or vice versa. Similarly, the communications interface 16 of the server entity 10 may be operable to allow the processing circuitry 12 of the server entity 10 to communicate with one or more first client entities described herein, one or more second client entities described herein, one or more third client entities described herein, and/or any other entity described herein. The communications interface 16 of the server entity 10 can be configured to transmit and/or receive information, data, messages, requests, responses, indications, notifications, signals, or similar, that are described herein. In some embodiments, the processing circuitry 12 of the server entity 10 may be configured to control the communications interface 16 of the server entity 10 to transmit and/or receive information, data, messages, requests, responses, indications, notifications, signals, or similar, that are described herein.

Although the server entity 10 is illustrated in FIG. 3 as comprising a single memory 14, it will be appreciated that the server entity 10 may comprise at least one memory (i.e. a single memory or a plurality of memories) 14 that operate in the manner described herein. Similarly, although the server entity 10 is illustrated in FIG. 3 as comprising a single communications interface 16, it will be appreciated that the server entity 10 may comprise at least one communications interface (i.e. a single communications interface or a plurality of communications interface) 16 that operate in the manner described herein. It will also be appreciated that FIG. 3 only shows the components required to illustrate an embodiment of the server entity 10 and, in practical implementations, the server entity 10 may comprise additional or alternative components to those shown.

Figure 4:
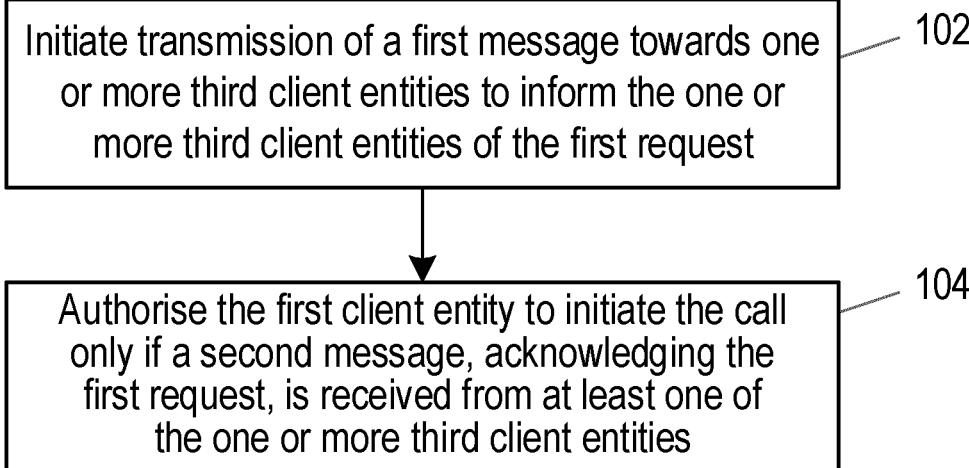
FIG. 4 is a flowchart illustrating a method performed by a server entity according to an embodiment.

FIG. 4 is a flowchart illustrating a method performed by the server entity 10 in accordance with an embodiment. The method is for handling a request to initiate a call. The server entity 10 described earlier with reference to FIG. 3 is configured to operate in accordance with the method of FIG. 4. The method can be performed by or under the control of the processing circuitry 12 of the server entity 10.

The method illustrated in FIG. 4 is performed in response to receiving a first request for a first client entity to initiate a call to a second client entity without the second client entity rendering a notification of the call. As the first request referred to herein is for the initiation of a call to the second client entity without the second client entity rendering a notification of the call, the call may be referred to herein as an ambient call. The call referred to herein can be an audio and/or video call according to some embodiments. Thus, in some embodiments, the call may be referred to herein as an ambient listening and/or viewing call.

As illustrated at block 102 of FIG. 4, in response to receiving the first request for the first client entity to initiate the call to the second client entity without the second client entity rendering a notification of the call, transmission of a first message is initiated towards one or more third client entities to inform the one or more third client entities of the first request. More specifically, the processing circuitry 12 of the server entity 10 initiates transmission of the first message towards the one or more third client entities. Herein, the term "initiate" can mean, for example, cause or establish. Thus, the processing circuitry 12 of the server entity 10 can be configured to itself transmit the first message (e.g. via a communications interface 16 of the server entity 10) or can be configured to cause another entity to transmit the first message. By way of the first message, the one or more third client entities are informed of the initiation of the call. In some embodiments, the first message can be a request for an acknowledgment of the first request.

The one or more third client entities may also be referred to herein as one or more witness client entities. The one or more third client entities referred to herein do not receive media (e.g. audio and/or video) from the second client entity in the call, but simply witness the initiation of the call. In this way, the transparency in the initiation of these sensitive features can be increased by making the initiation process visible to one or more (e.g. pre-defined) witness clients, thereby creating a deterrent against any misuse or abuse of ambient (e.g. listening and/or viewing) calls. In some embodiments, the one or more witness clients may expect to be informed by the server entity 10 about an ambient call request.

In some embodiments, the one or more third client entities may comprise at least one third client entity that is predetermined. For example, in some embodiments, the one or more third client entities may comprise at least one third client entity that is predefined for the second client entity. For example, in an embodiment where the second client entity belongs to a high-ranking public safety officer, the one or more third client entities can be identified more carefully to prevent any misuse. Alternatively or in addition, in some embodiments, the one or more third client entities may comprise at least one third client entity that is specified in the first request. For example, the first request may comprise an identity of at least one third client entity. In some of these embodiments, the first client entity may itself identify at least one third client entity. This may be particularly advantageous in emergency or secret operations.

Alternatively or in addition, in some embodiments, the one or more third client entities may comprise at least one third client entity that is randomly selected. Although not illustrated in FIG. 4, in some embodiments, the method may comprise randomly selecting at least one of the one or more third client entities. More specifically, in some embodiments, the processing circuitry 12 of the server entity 10 may be configured to randomly select at least one of the one or more third client entities. In some embodiments, at least one of the one or more third client entities may be randomly selected if no third client entities are predetermined (e.g. if no third client entities are specified in the first request).

In some embodiments, a number of third client entities towards which transmission of the first message is initiated may be set based on an identity of the second client entity. That is, for example, the number of third client entities towards which transmission of the first message is initiated may be determined depending on which client entity is to be listened to or viewed.

Herein, the first client entity 30, the second client entity 40, and the one or more third client entities 20 are different client entities. The one or more third client entities 20 can, for example, be one or more client entities other than those actively involved in the ambient (e.g. listening and/or viewing) call procedure, i.e. other than the first client entity 30 and the second client entity 40.

In some embodiments, the first message referred to herein may comprise any one or more of an identifier that identifies the first client entity, an identifier that identifies the second client entity, information indicative of whether approval of the first request is required, and information indicative that the call is to be initiated by the first client entity. The information indicative that the call is to be initiated by the first client entity can also be referred to as information indicative that the call is to be remotely initiated. That is, the call is to be initiated remotely at the first client entity (e.g. by a user, such as a dispatcher) to the second client entity, where the second client entity is a different entity to the first client entity. The first client entity can also be referred to herein as the calling entity, or the listening and/or viewing entity. The second entity can also be referred to herein as the called entity, or the listened to or views entity.

An example of a first message, where the first request is a request to initiate a mission critical push to talk (MCPTT) call, is provided in the table below:

| Information Element | Status | Description |
| --- | --- | --- |
| MCPTT ID | M | The MCPTT ID of the first (or "listening") client entity |
| MCPTT ID | M | The MCPTT ID of the second (or "listened to") client entity |
| Approval required | M | Yes or No |
| Ambient listening type | M | The ambient listening type indicates a remotely initiated ambient listening call or a locally initiated ambient listening call. |

Returning back to FIG. 4, as illustrated at block 104, the first client entity is authorised to initiate the call only if a second message, acknowledging the first request, is received from at least one of the one or more third client entities. More specifically, the processing circuitry 12 of the server entity 10 authorises the first client entity to initiate the call only if a second message, acknowledging the first request, is received from at least one of the one or more third client entities.

Thus, in this way, the server entity 10 (or, more specifically, the processing circuitry 12 of the server entity 10) can authorise the first client entity to initiate the call based on the receipt of at least one second message acknowledging the first request. That is, the server entity 10 (or, more specifically, the processing circuitry 12 of the server entity 10) can authorise the first client entity to initiate the call based on the receipt of at least one acknowledgment message. More specifically, the server entity 10 (or, more specifically, the processing circuitry 12 of the server entity 10) can authorise the first client entity to initiate the call provided at least one acknowledgement message is received.

In some embodiments, the first client entity may be authorised to initiate the call only if the first request is approved by at least one of the one or more third client entities. In some embodiments, the second message received from at least one of the one or more third client entities may comprise information indicative of whether the first request is approved or denied. Alternatively or in addition, in some embodiments, a third message received from at least one of the one or more third client entities may comprise information indicative of whether the first request is approved or denied. Thus, in some embodiments, the first client entity may be authorised to initiate the call only if an approval message is received from at least one of the one or more third client entities.

In some embodiments, authorising the first client entity to initiate the call only if the first request is approved by at least one of the one or more third client entities may comprise authorising the first client entity to initiate the call only if the first request is approved by each (or all) of the one or more third client entities. Thus, in some embodiments, the server entity 10 (or, more specifically, the processing circuitry 12 of the server entity 10) may only authorise the first client entity to initiate the call if an approval message is received from every third client entity.

In other embodiments, authorising the first client entity to initiate the call only if the first request is approved by at least one of the one or more third client entities may comprise authorising the first client entity to initiate the call only if the first request is approved by at least a threshold number (e.g. a subset) of the one or more third client entities. Thus, in some embodiments, a certain number of approval messages may be required in order for the first client entity to be authorised to initiate the call. In some embodiments, the threshold number may be fixed. For example, the threshold number may be fixed irrespective of the first request that is received. In other embodiments, the threshold number may be adaptive (or dynamic). For example, the threshold number may be adapted depending on the first request that is received. The threshold number can be set based on a variety of factors.

In some embodiments, the threshold number may be set based on contextual information for the first request and/or an identity of the second client entity. That is, for example, the threshold number may be determined depending on which client entity is to be listened to and/or viewed. In some embodiments, the contextual information for the first request may comprise a level of risk associated with authorising the first request, e.g. an emergency level of an incident associated with the first request, a criticality of an operation associated with the first request, etc. This enables risk-based decision making on the required number of approval messages needed to authorise the first request. In some embodiments, these kinds of factors can (e.g. automatically) be evaluated by another entity and fed into the server entity 10 as auxiliary data, which can act as a context-aware mechanism. Although some example factors have been provided for the setting of threshold number, it will be understood that the threshold number may be set based on any other factor and/or any combination of factors.

Thus, in this way, the server entity 10 (or, more specifically, the processing circuitry 12 of the server entity 10) can authorise the first client entity to initiate the call based on the receipt of at least one (second or third) message comprising information indicative that the first request is approved. That is, the server entity 10 (or, more specifically, the processing circuitry 12 of the server entity 10) can authorise the first client entity to initiate the call based on the receipt of at least one approval message. More specifically, the server entity 10 (or, more specifically, the processing circuitry 12 of the server entity 10) can authorise the first client entity to initiate the call provided at least one approval message is received.

In some embodiments, if no second message (acknowledging the first request) is received or less than the required number of approval messages is received on expiry of a predefined time period, transmission of the first message may be initiated towards one or more other third client entities to inform the one or more other third client entities of the first request. In these embodiments, the method may comprise authorising the first client entity to initiate the call only if a second message (acknowledging the first request) is received from at least one of the one or more other third client entities and optionally only if the required number of approval messages are received from the one or more other third client entities. Here, the required number of approval messages may be an approval message from any one third client entity, an approval message from each third client entity, or an approval message from the threshold number of third client entities. In some embodiments, these steps may be repeated, e.g. until at least one second message (acknowledging the first request) is received and optionally until at least one approval message is received. In some embodiments, a timer may be set for the predefined time period. For example, the timer may be set in response to initiating transmission of the first message. The server entity 10 (or, more specifically, the processing circuitry 12 of the server entity 10) may be configured to set the timer. Thus, if not enough third entity clients return a response, the server entity 10 can inform other third entity clients (e.g. those that are expected to return a response) according to some embodiments. This can be particularly beneficial where one or more third client entities failed to receive the first message, one or more third client entities are unreachable, one or more third client entities are unavailable, and/or one or more third client entities are having communication issues, since these situations will then not prevent the initiation of the ambient call. In this way, it is possible to acquire at least one second message (acknowledging the first request) and optionally also enough approval messages as soon as possible to prevent any delay in initiating the ambient call, which can be particularly important in case of an emergency.

In some embodiments, the at least one second message may comprise any one or more of an identifier that identifies the first client entity, an identifier that identifies the second client entity, information indicative of whether the first request is approved or denied, and one or more identifiers that each identify one of the one or more third client entities.

An example of a second message, where the first request is a request to initiate a mission critical push to talk (MCPTT) call, is provided in the table below:

| Information Element | Status | Description |
|---|---|---|
| MCPTT ID | M | The MCPTT ID of the first (or "listening") client entity |
| MCPTT ID | M | The MCPTT ID of the second (or "listened to") client entity |
| Approve or Deny | M | Approve or Deny |
| MCPTT ID | M | The MCPTT ID of the third (or "witness") client entity |

Although not illustrated in FIG. 4, in some embodiments, if the first request is authorised, transmission of the first request may be initiated towards the second client entity and/or transmission of a fourth message may be initiated towards the first client entity. More specifically, the processing circuitry 12 of the server entity 10 can be configured to initiate transmission of (e.g. itself transmit, such as via a communications interface 16 of the server entity 10, or cause another entity to transmit) the first request towards the second client entity and/or the fourth message towards the first client entity. The fourth message can be indicative that the first request is authorised.

On the other hand, if the first request is not authorised, transmission of a fifth message may be initiated towards the first client entity according to some embodiments. More specifically, the processing circuitry 12 of the server entity 10 can be configured to initiate transmission of (e.g. itself transmit, such as via a communications interface 16 of the server entity 10, or cause another entity to transmit) the fifth message towards the first client entity. The fifth message can be indicative that the first request is not authorised.

In response to receiving the first request, the second client entity can automatically accept the call without rendering a notification of the call. That is, the second client entity can automatically accept the call without causing any indication about the call. Thus, a user of the second client entity is unaware of the call. The second client entity can transmit media (e.g. audio and/or video) from the call to the first client entity. In this way, the first client entity can listen to and/or view the call without the user of the second client entity knowing. This is also referred to in the art as ambient listening and/or viewing.

Although not illustrated in FIG. 4, in some embodiments, the method may comprise setting a maximum duration for the call. More specifically, in some embodiments, the processing circuitry 12 of the server entity 10 may set the maximum duration for the call. In some embodiments, after the maximum duration for the call, the call may disconnect or timeout. In this way, even if the first client entity initiated a legitimate ambient call, the first client entity can be prevented from maliciously continuing to connect to the call when there is no longer a need to do so. In some embodiments, the maximum duration may be set by the server entity 10 or the first client entity. In some embodiments, the first message may comprise the maximum duration for the call. Thus, in some embodiments, the one or more third client entities may be informed of the maximum duration for the call. In some embodiments, after expiry of the maximum duration for the call, the first client entity may be required to initiate transmission of a third request towards the server entity 10 to continue connecting to the call or to initiate another ambient call to the second client entity. In these embodiments, the method described herein may then be repeated in respect of the third request.

Figures 5, 6:
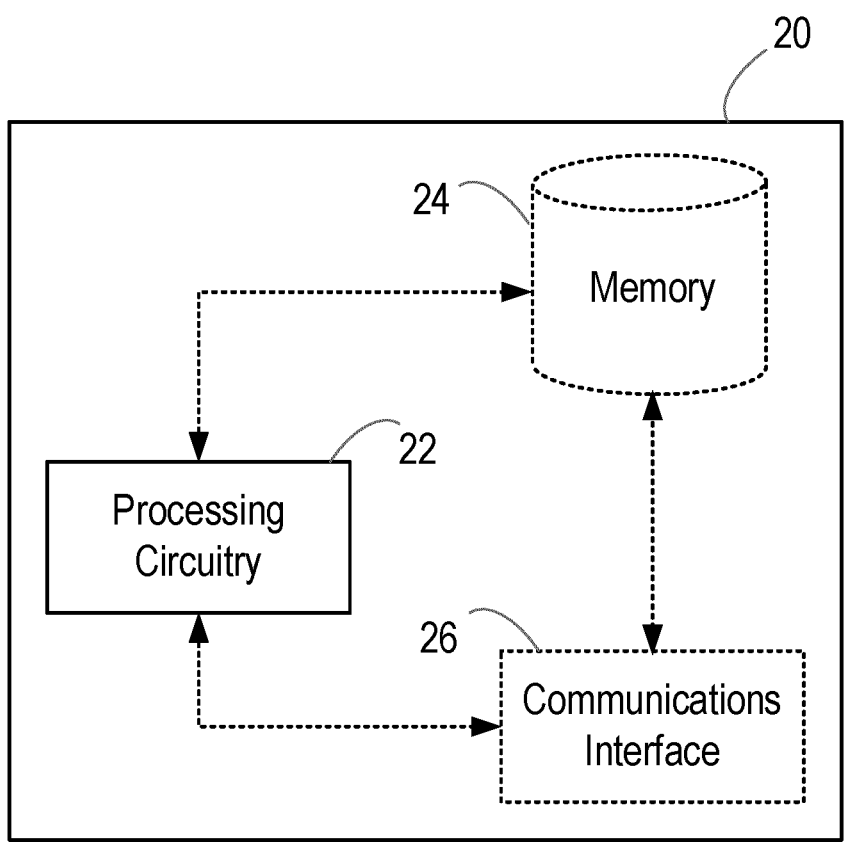
FIG. 5 is a block diagram illustrating a third client entity according to an embodiment.
FIG. 6 is a flowchart illustrating a method performed by a third client entity according to an embodiment.

FIG. 5 illustrates the third client entity 20 in accordance with an embodiment. The third client entity 20 is for handling a request to initiate a call. The third client entity 20 may, for example, be a physical machine or a virtual machine (VM). In some embodiments, the third client entity 20 may be a user equipment (UE), such as a mobile terminal. The third client entity 20 can also be referred to herein as a witness client entity.

As illustrated in FIG. 5, the third client entity 20 comprises processing circuitry (or logic) 22. The processing circuitry 22 controls the operation of the third client entity 20 and can implement the method described herein in respect of the third client entity 20. The processing circuitry 22 can be configured or programmed to control the third client entity 20 in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the third client entity 20. In some embodiments, the processing circuitry 22 can be configured to run software to perform the method described herein in respect of the third client entity 20. The software may be containerised according to some embodiments. Thus, in some embodiments, the processing circuitry 22 may be configured to run a container to perform the method described herein in respect of the third client entity 20.

Briefly, the processing circuitry 22 of the third client entity 20 is configured to, in response to receiving a first message that informs the third client entity of a first request, initiate transmission of a second message towards the server entity 10 that initiated transmission of the first message towards the third client entity. As mentioned earlier, the first request is a request for a first client entity to initiate a call to a second client entity without the second client entity rendering a notification of the call. The second message acknowledges the first request.

As illustrated in FIG. 5, in some embodiments, the third client entity 20 may optionally comprise a memory 24. The memory 24 of the third client entity 20 can comprise a volatile memory or a non-volatile memory. In some embodiments, the memory 24 of the third client entity 20 may comprise a non-transitory media. Examples of the memory 24 of the third client entity 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the third client entity 20 can be connected to the memory 24 of the third client entity 20. In some embodiments, the memory 24 of the third client entity 20 may be for storing program code or instructions which, when executed by the processing circuitry 22 of the third client entity 20, cause the third client entity 20 to operate in the manner described herein in respect of the third client entity 20. For example, in some embodiments, the memory 24 of the third client entity 20 may be configured to store program code or instructions that can be executed by the processing circuitry 22 of the third client entity 20 to cause the third client entity 20 to operate in accordance with the method described herein in respect of the third client entity 20. Alternatively or in addition, the memory 24 of the third client entity 20 can be configured to store any information, data, messages, requests, responses, indications, notifications, signals, or similar, that are described herein. The processing circuitry 22 of the third client entity 20 may be configured to control the memory 24 of the third client entity 20 to store information, data, messages, requests, responses, indications, notifications, signals, or similar, that are described herein.

In some embodiments, as illustrated in FIG. 5, the third client entity 20 may optionally comprise a communications interface 26. The communications interface 26 of the third client entity 20 can be connected to the processing circuitry 22 of the third client entity 20 and/or the memory 24 of third client entity 20. The communications interface 26 of the third client entity 20 may be operable to allow the processing circuitry 22 of the third client entity 20 to communicate with the memory 24 of the third client entity 20 and/or vice versa. Similarly, the communications interface 26 of the third client entity 20 may be operable to allow the processing circuitry 22 of the third client entity 20 to communicate with the server entity 10 described herein, one or more first client entities described herein, one or more second client entities described herein, and/or any other entity described herein. The communications interface 26 of the third client entity 20 can be configured to transmit and/or receive information, data, messages, requests, responses, indications, notifications, signals, or similar, that are described herein. In some embodiments, the processing circuitry 22 of the third client entity 20 may be configured to control the communications interface 26 of the third client entity 20 to transmit and/or receive information, data, messages, requests, responses, indications, notifications, signals, or similar, that are described herein.

Although the third client entity 20 is illustrated in FIG. 5 as comprising a single memory 24, it will be appreciated that the third client entity 20 may comprise at least one memory (i.e. a single memory or a plurality of memories) 24 that operate in the manner described herein. Similarly, although the third client entity 20 is illustrated in FIG. 5 as comprising a single communications interface 26, it will be appreciated that the third client entity 20 may comprise at least one communications interface (i.e. a single communications interface or a plurality of communications interface) 26 that operate in the manner described herein. It will also be appreciated that FIG. 5 only shows the components required to illustrate an embodiment of the third client entity 20 and, in practical implementations, the third client entity 20 may comprise additional or alternative components to those shown.

Although not illustrated, the first client entity and/or the second client entity referred to herein may comprise the same or similar components to the third client entity 20. In some embodiments, along with performing their own function as described herein, the first client entity and/or the second client entity referred to herein may also operate in the manner described herein in respect of the third client entity 20.

FIG. 6 is a flowchart illustrating a method performed by the third client entity 20 in accordance with an embodiment. The method is for handling a request to initiate a call. The third client entity 20 described earlier with reference to FIG. 5 is configured to operate in accordance with the method of FIG. 6. The method can be performed by or under the control of the processing circuitry 22 of the third client entity 20. The third client entity 20 can, for example, be a third client entity that is predefined for the second client entity referred to herein, a third client entity that is specified in the first request referred to herein, and/or a third client entity that is randomly selected.

As illustrated at block 202 of FIG. 6, in response to receiving a first message that informs the third client entity 20 of a first request, transmission of a second message is initiated towards the server entity 10 that initiated transmission of the first message towards the third client entity 20. More specifically, the processing circuitry 22 of the third client entity 20 initiates transmission of (e.g. itself transmit, such as via a communications interface 26 of the third client entity 20, or cause another entity to transmit) the second message towards the server entity 10. As mentioned earlier, the first request is a request for a first client entity 30 to initiate a call to a second client entity without the second client entity rendering a notification of the call. The second message acknowledges the first request.

Although not illustrated in FIG. 6, in some embodiments, the method may comprise approving or denying the first request. More specifically, the processing circuitry 22 of the third client entity 20 may be configured to approve or deny the first request according to some embodiments. The first request may be denied if any misuse is suspected. In some embodiments, the method may comprise controlling a user interface (e.g. a display or screen) to output a notification requesting a user input indicative of whether the first request is to be approved or denied. More specifically, the processing circuitry 22 of the third client entity 20 can be configured to control a user interface in this way. The user interface may be a user interface of the third client entity 20 or another user interface. In some embodiments, in response to receiving the user input indicative of whether the first request is to be approved or denied, the first request may be approved or denied according to the user input.

In some embodiments, the second message may comprise information indicative of whether the first request is approved or denied. In other embodiments, the method may comprise initiating transmission of a third message towards the server entity 10, wherein the third message comprises information indicative of whether the first request is approved or denied. Thus, the second (or third) message can be an approval message or a denial message.

As the third client entity 20 has the option to deny the first request, the third client entity 20 is able to take some warning action, e.g. when any misuse of an ambient call is suspected, which may prevent irrecoverable damages. This, in itself, can reduce the risks of misuse. Moreover, simply having one or more third client entities 20 operating in the manner described herein can act as a deterrent against any misuse, since it makes the initiation of ambient calls more transparent.

In some embodiments, the method described herein may be repeated whenever (e.g. each or every time) a request to initiate a call is received, e.g. by the server entity 10. That is, each time a request to initiate a call is received, the one or more third client entities may be informed of the request and the method descried herein may then be repeated in respect of that request. In the case of a failure to identify one or more third client entities, the method may operate according to the original setting.

There is also provided a method performed by a system. The method comprises the method described earlier in respect of the server entity and the method described earlier in respect of the third client entity. There is also provided a system comprising the server entity 10 as described earlier and at least one third client entity 20 as described earlier.

Figure 7:
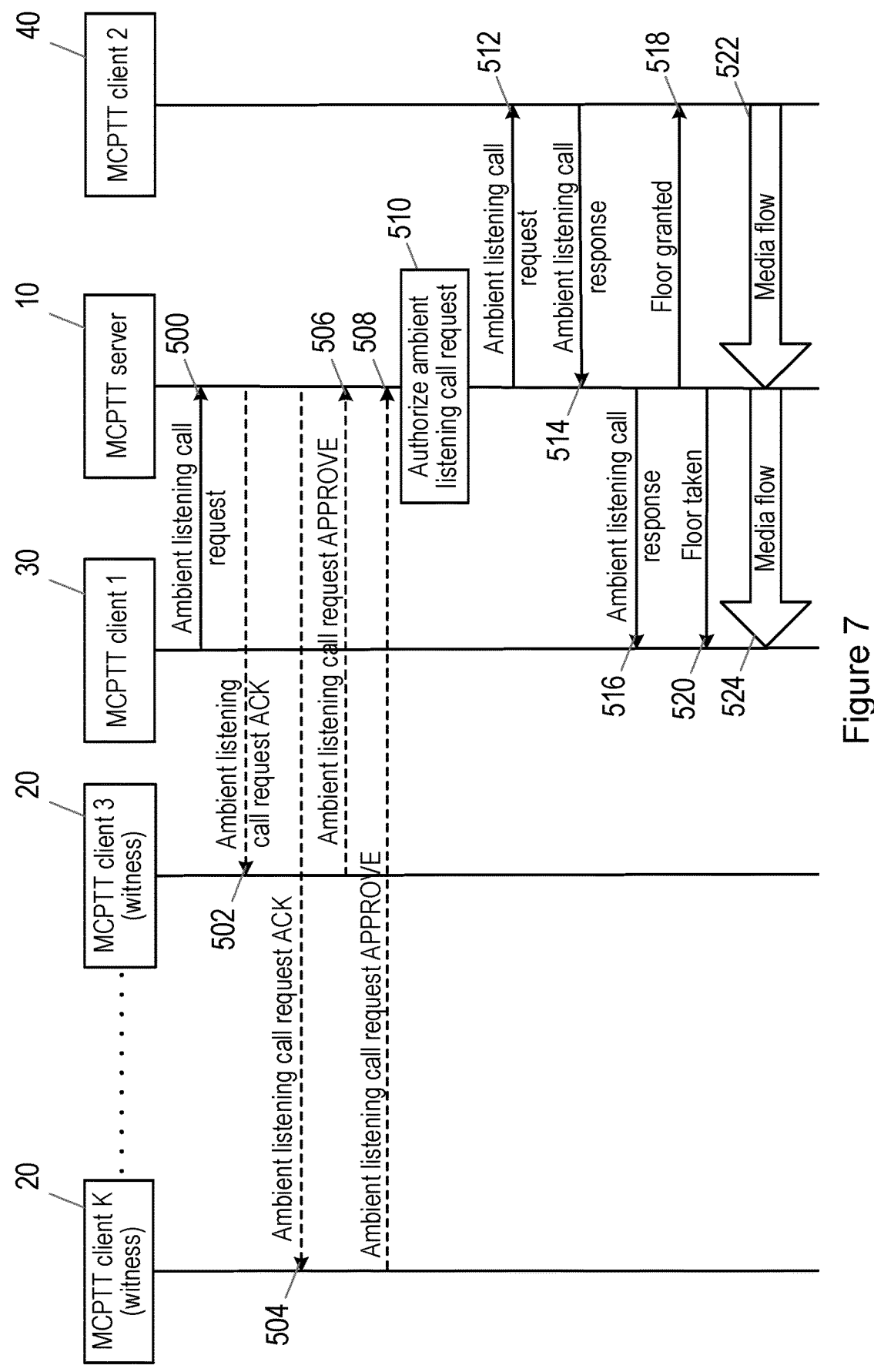
FIG. 7 is a signalling diagram illustrating an exchange of signals in a system according to an embodiment.

FIG. 7 is a signalling diagram illustrating an exchange of signals in a system according to an embodiment. The system illustrated in FIG. 7 comprises a server entity 10 and one or more third entities 20.

In the system illustrated in FIG. 7, the one or more third entities 20 comprise the third client entity labelled "client 3" and the third client entity labelled "client K", and optionally one or more other third client entities. However, it will be understood that in other embodiments, the one or more third entities 20 may comprise only one third entity or any other number of third entities. The server entity 10 can be as described earlier with reference to FIGS. 3 and 4. The one or more third client entities 20 can be as described earlier with reference to FIGS. 5 and 6. The system illustrated in FIG. 7 also comprises a first client entity 30 and a second client entity 40. In the illustrated embodiment of FIG. 7, the call is an audio call. The system illustrated in FIG. 7 can, for example, be a mission critical push to talk (MCPTT) system. Thus, the server entity 10 can be referred to as an MCPTT server entity and the client entities 20, 30, 40 can be referred to as MCPTT client entities.

As illustrated by arrow 500 of FIG. 7, the first client entity 30 initiates transmission of a first request towards the server entity 10. This first request is for the first client entity 30 to initiate a call to the second client entity 40 without the second client entity 40 rendering a notification of the call. In the illustrated embodiment of FIG. 7, the call is an audio call and thus the first request is a request to listen to the call, which may also be referred to as an ambient listening call request.

As illustrated by arrows 502 and 504 of FIG. 7, in response to receiving the first request, the server entity 10 initiates transmission of a first message towards one or more third client entities 20 to inform the one or more third client entities 20 of the first request. In some embodiments, the first message can be a request for an acknowledgment of the first request. Thus, the first message may also be referred to as an ambient listening call request acknowledgment (ACK). In some embodiments, in response to receiving the first message, each of the one or more third client entities 20 may approve or deny the first request. However, in other embodiments, it may be the case that the one or more third client entities 20 neither deny nor approve the first request, e.g. where approval is not required. This may, for example, be specified in the first message.

As illustrated by arrows 506 and 508 of FIG. 7, each of the one or more third client entities 20 initiates transmission of a second message towards the server entity 10 that initiated transmission of the first message towards the third client entity 20. The second message acknowledges the first request. In some embodiments, such as that illustrated in FIG. 7, each second message may comprise information that is indicative of whether the first request is approved or denied by the respective third entity. In the illustrated embodiment of FIG. 7, the server entity 10 receives two second messages, each of which comprise information that is indicative that the first request is approved by the respective third entity. However, it will be understood that any other number of first and/or second messages is also possible and at least some of the second messages may instead be indicative that the first request is denied according to other embodiments.

As illustrated by block 510 of FIG. 7, in response to receiving at least one second message comprising information indicative of whether the first request is approved or denied, the server entity 10 authorises the first client entity 30 to initiate the call but only if the first request is approved by at least one of the one or more third client entities 20. In the illustrated embodiment of FIG. 7, the server entity 10 receives two second messages, each of which comprise information that is indicative that the first request is approved by the respective third entity and thus the server entity 10 authorises the first client entity 30 to initiate the call. However, it will be understood that, in other embodiments, the server entity 10 may authorise the first client entity 30 to initiate the call provided that a second message, acknowledging the first request, is received from at least one of the one or more third client entities, irrespective of whether the second message comprises information that is indicative that the first request is approved.

As illustrated by arrow 512 of FIG. 7, if the first request is authorised (as it is in this illustrated embodiment), the server entity 10 initiates transmission of the first request towards the second client entity 40. As illustrated by arrow 514 of FIG. 7, in response to receiving the first request, the second client entity 40 initiates transmission of a response towards the server entity 10. In the illustrated embodiment of FIG. 7, this response may also be referred to as an ambient listening call response. As illustrated by arrow 516 of FIG. 7, the server entity 10 initiates transmission of the response towards the first client entity 30. The response indicates whether the call set up is successful or unsuccessful.

As illustrated by arrow 518 of FIG. 7, the server entity 10 (e.g. a floor control server of the server entity 10) initiates transmission of a floor granted message to the second client 40, e.g. according to the ambient listening type received at arrow 500 of FIG. 7. In the illustrated embodiment of FIG. 7, a floor is defined as a (e.g. temporary) permission granted to the first client entity 30 for the first client entity 30 to listen to the call initiated to the second client entity 40. Thus, the floor granted message is a message indicative that this permission has been granted. Accordingly, as illustrated by arrow 520 of FIG. 7, the server entity 10 (e.g. a floor control server of the server entity 10) initiates transmission of a floor taken message to the first client entity 30. The floor taken message is a message that informs the first client entity 30 of the initiation of the call.

In response to receiving the floor granted message, as illustrated by arrows 522 and 524 of FIG. 7, the second client entity 40 initiates transmission of media (which, in this illustrated embodiment, is audio) to the first client entity 30 via the server entity 10. Thus, an ambient listening call is set up. The second client entity 40 does not provide any indication of the ambient listening call to its user.

Figure 8:
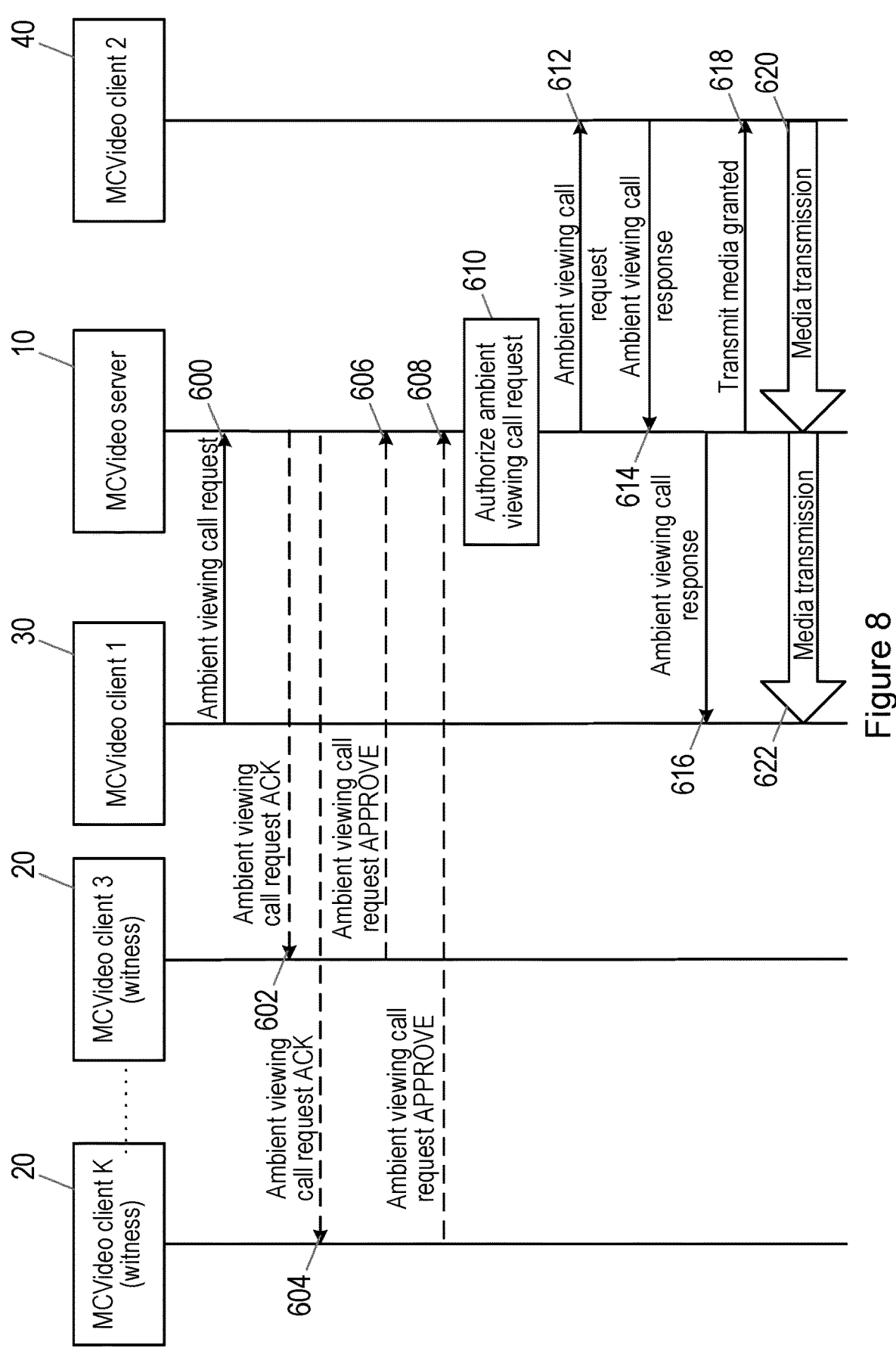
FIG. 8 is a signalling diagram illustrating an exchange of signals in a system according to an embodiment.

FIG. 8 is a signalling diagram illustrating an exchange of signals in a system according to an embodiment. The system illustrated in FIG. 8 comprises a server entity 10 and one or more third entities 20.

In the system illustrated in FIG. 8, the one or more third entities 20 comprise the third client entity labelled "client 3" and the third client entity labelled "client K", and optionally one or more other third client entities. However, it will be understood that in other embodiments, the one or more third entities 20 may comprise only one third entity or any other number of third entities. The server entity 10 can be as described earlier with reference to FIGS. 3 and 4. The one or more third client entities 20 can be as described earlier with reference to FIGS. 5 and 6. The system illustrated in FIG. 8 also comprises a first client entity 30 and a second client entity 40. In the illustrated embodiment of FIG. 8, the call is a video call. The system illustrated in FIG. 8 can, for example, be a mission critical video (MCVideo) system. Thus, the server entity 10 can be referred to as an MCVideo server entity and the client entities 20, 30, 40 can be referred to as MCVideo client entities.

As illustrated by arrow 600 of FIG. 8, the first client entity 30 initiates transmission of a first request towards the server entity 10. This first request is for the first client entity 30 to initiate a call to the second client entity 40 without the second client entity 40 rendering a notification of the call. In the illustrated embodiment of FIG. 8, the call is a video call and thus the first request is a request to view the call, which may also be referred to as an ambient viewing call request.

As illustrated by arrows 602 and 604 of FIG. 8, in response to receiving the first request, the server entity 10 initiates transmission of a first message towards one or more third client entities 20 to inform the one or more third client entities 20 of the first request. In some embodiments, the first message can be a request for an acknowledgment of the first request. Thus, the first message may also be referred to as an ambient viewing call request acknowledgment (ACK). In some embodiments, in response to receiving the first message, each of the one or more third client entities 20 may approve or deny the first request. However, in other embodiments, it may be the case that the one or more third client entities 20 neither deny nor approve the first request, e.g. where approval is not required. This may, for example, be specified in the first message.

As illustrated by arrows 606 and 608 of FIG. 8, each of the one or more third client entities 20 initiates transmission of a second message towards the server entity 10 that initiated transmission of the first message towards the third client entity 20. The second message acknowledges the first request. In some embodiments, such as that illustrated in FIG. 8, each second message may comprise information that is indicative of whether the first request is approved or denied by the respective third entity. In the illustrated embodiment of FIG. 8, the server entity 10 receives two second messages, each of which comprise information that is indicative that the first request is approved by the respective third entity. However, it will be understood that any other number of first and/or second messages is also possible and at least some of the second message may instead be indicative that the first request is denied according to other embodiments.

As illustrated by block 610 of FIG. 8, in response to receiving at least one second message comprising information indicative of whether the first request is approved or denied, the server entity 10 authorises the first client entity 30 to initiate the call but only if the first request is approved by at least one of the one or more third client entities 20. In the illustrated embodiment of FIG. 8, the server entity 10 receives two second messages, each of which comprise information that is indicative that the first request is approved by the respective third entity and thus the server entity 10 authorises the first client entity 30 to initiate the call. However, it will be understood that, in other embodiments, the server entity 10 may authorise the first client entity 30 to initiate the call provided that a second message, acknowledging the first request, is received from at least one of the one or more third client entities, irrespective of whether the second message comprises information that is indicative that the first request is approved.

As illustrated by arrow 612 of FIG. 8, if the first request is authorised (as it is in this illustrated embodiment), the server entity 10 initiates transmission of the first request towards the second client entity 40. As illustrated by arrow 614 of FIG. 8, in response to receiving the first request, the second client entity 40 initiates transmission of a response towards the server entity 10. In the illustrated embodiment of FIG. 8, this response may also be referred to as an ambient viewing call response. As illustrated by arrow 616 of FIG. 8, the server entity 10 initiates transmission of the response towards the first client entity 30. The response indicates whether the call set up is successful or unsuccessful.

As illustrated by arrow 618 of FIG. 8, the server entity 10 initiates transmission of a transmit media granted message to the second client 40, e.g. according to the ambient viewing type received at arrow 600 of FIG. 8. In the illustrated embodiment of FIG. 8, the media is audio. Thus, the transmit media granted message is a message indicative that permission has been granted to transmit audio. In response to receiving the transmit media granted message, as illustrated by arrows 620 and 622 of FIG. 8, the second client entity 40 initiates transmission of the media (which, in this illustrated embodiment, is video) to the first client entity 30 via the server entity 10. Thus, an ambient viewing call is set up. The second client entity 40 does not provide any indication of the ambient viewing call to its user.

Figure 9:
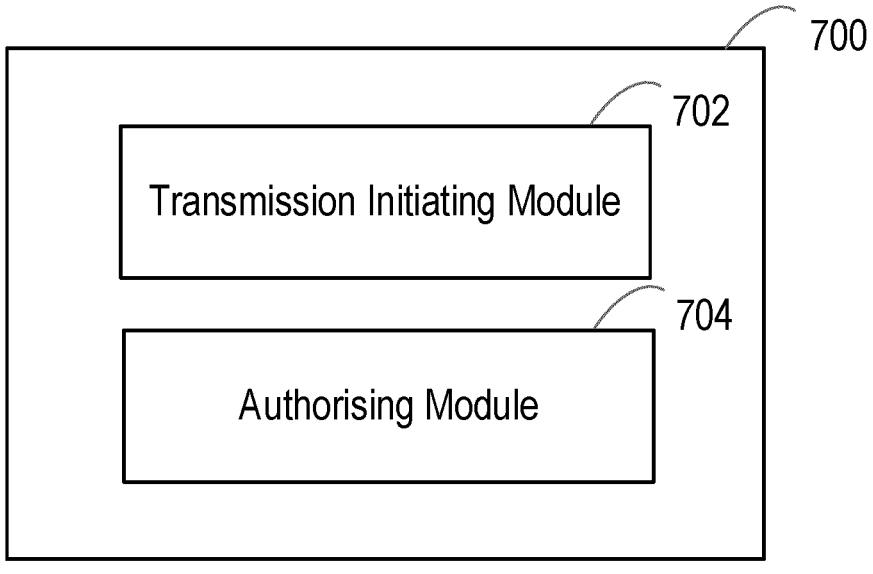
FIG. 9 is a block diagram illustrating a server entity according to an embodiment.

FIG. 9 is a block diagram illustrating a server entity 700 in accordance with an embodiment. The server entity 700 comprises a transmission initiating module 702 configured to, in response to receiving a first request for a first client entity to initiate a call to a second client entity without the second client entity rendering a notification of the call, initiate transmission of a first message towards one or more third client entities to inform the one or more third client entities of the first request. The server entity 700 also comprises an authorising module 704 configured to authorise the first client entity to initiate the call only if a second message, acknowledging the first request, is received from at least one of the one or more third client entities. The server entity 700 may operate in the manner described herein in respect of the server entity.

Figure 10:
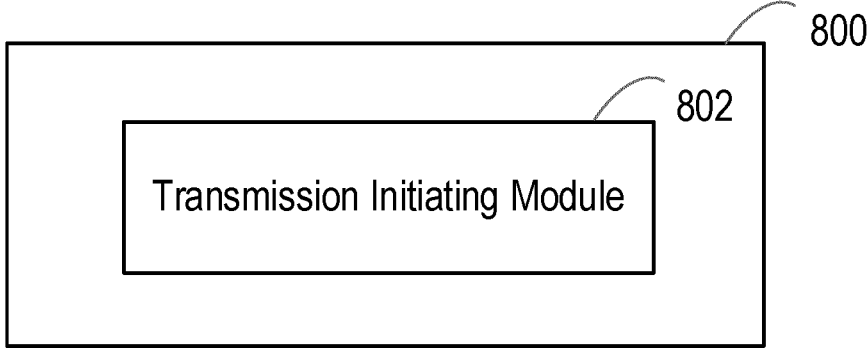
FIG. 10 is a block diagram illustrating a third client entity according to an embodiment.

FIG. 10 is a block diagram illustrating a third client entity 800 in accordance with an embodiment. The third client entity 800 comprises a transmission initiating module 802 configured to, in response to receiving a first message that informs the third client entity of a first request, initiate transmission of a second message towards a server entity that initiated transmission of the first message towards the third client entity. The first request is a request for a first client entity to initiate a call to a second client entity without the second client entity rendering a notification of the call. The second message acknowledges the first request. The third client entity 800 may operate in the manner described herein in respect of the third client entity.

There is also provided a computer program comprising instructions which, when executed by processing circuitry (such as the processing circuitry 12 of the server entity 10 described earlier and/or the processing circuitry 22 of the third client entity 20 described earlier), cause the processing circuitry to perform at least part of the method described herein. There is provided a computer program product, embodied on a non-transitory machine-readable medium, comprising instructions which are executable by processing circuitry (such as the processing circuitry 12 of the server entity 10 described earlier and/or the processing circuitry 22 of the third client entity 20 described earlier) to cause the processing circuitry to perform at least part of the method described herein. There is provided a computer program product comprising a carrier containing instructions for causing processing circuitry (such as the processing circuitry 12 of the server entity 10 described earlier and/or the processing circuitry 22 of the third client entity 20 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the server entity functionality, the third entity functionality, and/or any other entity functionality described herein can be performed by hardware. Thus, in some embodiments, the server entity 10, the third client entity 20, and/or any other entity described herein can be a hardware entity. However, it will also be understood that optionally at least part or all of the server entity functionality, the third entity functionality, and/or any other entity functionality described herein can be virtualized. For example, the functions performed by the server entity 10, the third client entity 20, and/or any other entity described herein can be implemented in software running on generic hardware that is configured to orchestrate the entity functionality. Thus, in some embodiments, the server entity 10, the third client entity 20, and/or any other entity described herein can be a virtual entity. In some embodiments, at least part or all of the server entity functionality, the third entity functionality, and/or any other entity functionality described herein may be performed in a network enabled cloud. The server entity functionality, the third entity functionality, and/or any other entity functionality described herein may all be at the same location or at least some of the entity functionality may be distributed.

It will be understood that at least some or all of the method steps described herein can be automated in some embodiments. That is, in some embodiments, at least some or all of the method steps described herein can be performed automatically.

Thus, in the manner described herein, there is advantageously provided techniques for handling a request to initiate a call. The techniques can deter against any misuse of ambient calls by increasing the transparency of the initiation of such as call.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for handling a request to initiate a call, wherein the method is performed by a server entity and the method comprises:
 in response to receiving a first request for a first client entity to initiate a call to a second client entity without the second client entity rendering a notification of the call:
 initiating transmission of a first message towards one or more third client entities to inform the one or more third client entities of the first request; and
 authorising the first client entity to initiate the call only if a second message, acknowledging the first request, is received from at least one of the one or more third client entities.

2. A method as claimed in claim 1, the method comprising:
 authorising the first client entity to initiate the call only if the first request is approved by at least one of the one or more third client entities.

3. A method as claimed in claim 2, wherein:
 authorising the first client entity to initiate the call only if the first request is approved by at least one of the one or more third client entities comprises:
 authorising the first client entity to initiate the call only if the first request is approved by at least a threshold number of the one or more third client entities.

4. A method as claimed in claim 3, wherein:
 the threshold number is adaptive.

5. A method as claimed in claim 3, wherein:
 the threshold number is set based on contextual information for the first request and/or an identity of the second client entity.

6. A method as claimed in claim 2, wherein:
 the second message received from at least one of the one or more third client entities comprises information indicative of whether the first request is approved or denied; and/or
 a third message received from at least one of the one or more third client entities comprises information indicative of whether the first request is approved or denied.

7. A method as claimed in claim 1, wherein:
 a number of third client entities towards which transmission of the first message is initiated is set based on an identity of the second client entity.

8. A method as claimed in claim 1, the method comprising:
 if the first request is authorised, initiating transmission of the first request towards the second client entity and/or initiating transmission of a fourth message towards the first client entity, wherein the fourth message is indicative that the first request is authorised; or
 if the first request is not authorised, initiating transmission of a fifth message towards the first client entity, wherein the fifth message is indicative that the first request is not authorised.

9. A method as claimed in claim 1, wherein:
 the first message comprises any one or more of:
 an identifier that identifies the first client entity;
 an identifier that identifies the second client entity;
 information indicative of whether approval of the first request is required; and
 information indicative that the call is to be initiated by the first client entity;
 and/or
 the at least one second message comprises any one or more of:
 an identifier that identifies the first client entity;
 an identifier that identifies the second client entity; and
 one or more identifiers that each identify one of the one or more third client entities.

10. A method as claimed in claim 1, wherein:
 the one or more third client entities comprise:
 at least one third client entity that is predefined for the second client entity;
 at least one third client entity that is specified in the first request; and/or
 at least one third client entity that is randomly selected.

11. A method as claimed in claim 1, the method comprising:
 setting a maximum duration for the call, after which the call disconnects.

12. A server entity comprising:
 processing circuitry configured to operate in accordance with claim 1.

13. A method for handling a request to initiate a call, wherein the method is performed by a third client entity and the method comprises:
 in response to receiving a first message that informs the third client entity of a first request, wherein the first request is a request for a first client entity to initiate a call to a second client entity without the second client entity rendering a notification of the call:
 initiating transmission of a second message towards a server entity that initiated transmission of the first message towards the third client entity, wherein the second message acknowledges the first request.

14. A method as claimed in claim 13, the method comprising:

approving or denying the first request.

15. A method as claimed in claim 14, wherein:

the second message comprises information indicative of whether the first request is approved or denied; or the method comprises:

initiating transmission of a third message towards the server entity, wherein the third message comprises information indicative of whether the first request is approved or denied.

16. A method as claimed in claim 14, the method comprising:

controlling a user interface to output a notification requesting a user input indicative of whether the first request is to be approved or denied; and in response to receiving the user input indicative of whether the first request is to be approved or denied, approving or denying the first request according to the user input.

17. A method as claimed in claim 13, wherein:

the first message comprises any one or more of:

an identifier that identifies the first client entity;

an identifier that identifies the second client entity;

information indicative of whether approval of the first request is required; and information indicative that the call is to be initiated by the first client entity;

and/or the second message comprises any one or more of:

an identifier that identifies the first client entity;

an identifier that identifies the second client entity; and an identifier that identifies the third client entities.

18. A method as claimed in claim 13, wherein:

the third client entity is:

a third client entity that is predefined for the second client entity;

a third client entity that is specified in the first request; and/or a third client entity that is randomly selected.

19. A third client entity comprising:

processing circuitry configured to operate in accordance with claim 13.

20. The method of claim 1, performed by a system, the method further comprising:

a method for handling a request to initiate a call, wherein the method is performed by a third client entity and the method comprises:

in response to receiving a first message that informs the third client entity of a first request, wherein the first request is a request for a first client entity to initiate a call to a second client entity without the second client entity rendering a notification of the call:

initiating transmission of a second message towards a server entity that initiated transmission of the first message towards the third client entity, wherein the second message acknowledges the first request.

* * * * *